United States Patent Office 2,876,249
Patented Mar. 3, 1959

2,876,249

PROCESS FOR PURIFICATION OF CRUDE PYRETHRUM EXTRACTS

Thomas A. Haney, Stony Brook, N. Y., assignor to Olin Mathieson Chemical Corporation, a corporation of Virginia No Drawing. Application April 19, 1957
Serial No. 653,748

4 Claims. (Cl. 260—468)

This invention relates to improvements in the purification of pyrethrum extracts. More particularly this invention relates to the purification of crude concentrated pyrethrum extracts in kerosene or other higher boiling hydrocarbon solvents containing approximately 20 to 30 weight percent of materials extracted from the pyrethrum flowers. One such extract is currently being imported into the United States and is commercially known as the 25 percent Kenya extract.

When pyrethrum flowers are leached with kerosene or other higher boiling hydrocarbon solvents, not only are the insecticidally valuable pyrethrins dissolved, but also certain resins and other impurities contained in the flowers. The latter must be removed before the Kenya extract can be diluted and prepared for resale to the consumer. Unless removed, these impurities will form sludges when the crude concentrated pyrethrum extract is diluted for use with Ultrasene and other commonly used highly refined kerosenes. Such a sludge generally clogs the nozzles of hand or machine-operated spraying devices. Furthermore, these sludges are readily precipitated by the Freons commonly used as aerosol propellants. Thus aerosol bombs are also subject to nozzle-fouling unless the crude extract is purified to remove the resin-like material.

The purification of the crude extract is generally accomplished by adding a non-solvent for the impurities such as a lower hydrocarbon, chilling and holding the mixture at a temperature of about −10° C. to −30° C. for several hours, and then centrifuging the cold mixture. Sufficient sludge can generally be removed by the various low-temperature centrifugation methods to give a pyrethrin solution suitable for concentration to the article of commerce known as Extract 100 containing 10 grams of pyrethrins in 100 milliliters of solvent. The latter extract is generally added to aerosol devices and the maximum tolerance of Freon insoluble material therein should not exceed 0.50 percent. Insoluble material in excess of this amount may cause clogging of spray nozzles.

Prior purification processes have required a distillation step to remove the non-solvent used to precipitate the Freon-insoluble material in order to obtain Extract 100 having a pyrethrin concentration of 10 grams per 100 milliliters of solvent.

In accordance with the invention it has been discovered that the crude concentrated extract can be purified by a simple process which eliminates the concentration step involving the hazardous distillation of flammable materials.

The process for doing this involves diluting the crude concentrated extract with kerosene, preferably a highly refined kerosene of the kind generally used as a pyrethrum diluent, to a pyrethrins concentration of about 10 to 15 percent by weight, and adding about 2 to 7 percent by weight, based upon the weight of the diluted extract, of a quaternary ammonium halide. After this, the mixture is agitated, cooled to and maintained at from −10° C. to −30° C. for from about one to thirty hours, and then at a temperature within that range subjected to an operation, such as filtration or centrifuging, in which the sludge present is separated from the rest of the mixture. Although not necessary, it is expedient to heat the initial mixture during the agitation period in order to decrease the time required for that step. Thus, at room temperature it may be necessary to agitate the mixture for twenty hours or longer in order to obtain the best final product, while at 100° C. only ten or fifteen minutes of agitation may be required to cause complete precipitation of the sludge upon cooling. The procedure just described gives a purified extract the pyrethrin concentration of which is above that normally used by the industry. In other words, a concentrate is obtained directly from the filtration step, and this concentrate can be further diluted, for example, with deodorized kerosene, in order to produce a product of the type generally marketed. Any color remaining in the solution after the sludge has been separated can readily be removed by conventional treatment as with an active carbon such as Darco S–51.

The quaternaries suitable for use in the present process are of the general formula:

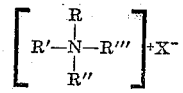

wherein R, R', R" and R''' are organic radicals and wherein X is halogen. For example, R, R', R" and R''' can be methyl, ethyl, benzyl, dimethylbenzyl, decyl, coco, cetyl, hydroxyethyl, carboxymethyl, 3,4-dichlorobenzyl, and so forth. They can be the same or different. Although such substitutions as just described are generally suitable to some degree, the preferred compounds are chlorides or bromides of those quaternaries which contain one or two aliphatic hydrocarbon radicals containing from 12 to 18 carbon atoms, such as dodecyl, coco, tetradecyl, hexadecyl, octadecyl, oleyl, ricinoleyl, and the like, and from two to three lower alkyl radicals, such as methyl or ethyl. The coco radical is obtained by the hydrogenation of coconut oil and is a substantially saturated alkyl radical containing 12 carbon atoms when pure. The impure material is also useful and contains alkyl groups having from 10 to 14 carbon atoms. Some unsaturates can be present in the carbon chains, depending upon the precise conditions under which the coco radical is prepared.

The following examples illustrate this invention.

*Example I*

A mixture comprising 250 grams of 25 weight percent Kenya extract, 250 grams of deodorized kerosene, and 25 grams of a 75 weight percent aqueous solution of dicocodimethyl quaternary ammonium chloride was warmed to 70° C. The mixture was then removed from the heat, agitated for 2 hours, chilled at −23° C. for 24 hours, and centrifuged at the latter temperature. The weight of sludge removed was 51.0 grams, and this had a pyrethrin content of 13.94 weight percent. The remaining 474 grams of purified extract had a pyrethrin content of 11.23 weight percent. This extract was decolorized by agitating it with 9.5 grams of Darco S–51, a proprietary active carbon, and 4.7 grams of Hi-flo Supercel, a proprietary filter aid, and filtering.

The purified extract was suitable for aerosol use. No further purification was necessary when this product was diluted with deodorized kerosene (Ultrasene) to Extract No. 20, a useful commercial product which contains 2 grams of pyrethrins in 100 milliliters of solution.

Example II

A mixture comprising 50 grams of 25 weight percent Kenya extract, 50 grams of Ultrasene, and 1 gram of 50 weight percent aqueous solution of cocotrimethyl ammonium chloride was warmed to 70° C. and agitated for one hour. After subsequent chilling of this mixture at −23° C. for 24 hours it was centrifuged. The resulting 13 weight percent pyrethrin solution was diluted with four times its volume of Ultrasene. The resulting Extract No. 20 remained clear and no precipitate formed on standing.

What is claimed is:

1. A method for the purification of a crude concentrated pyrethrum extract in which the solvent is a higher boiling hydrocarbon solvent and which contains approximately 20 to 30 weight percent of materials extracted from the pyrethrum flowers including the steps of admixing the extract with kerosene in amount such that the mixture contains from approximately 10 to 15 weight percent of pyrethrins and with a quaternary ammonium halide in amount such that the mixture contains from about 2 to 7 weight percent of said halide, agitating the mixture, cooling the mixture to from −10° C. to −30° C. for from about one to thirty hours, and at a temperature of from −10° C. to −30° C. separating the sludge present from the remainder of the mixture.

2. The method of claim 1 wherein said higher boiling hydrocarbon solvent is kerosene and wherein said quaternary ammonium halide is of the class:

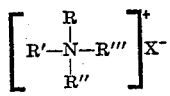

wherein R and R' are lower alkyl, wherein R'' is an aliphatic hydrocarbon radical containing from 12 to 18 carbon atoms, wherein R''' is selected from the group consisting of lower alkyl and aliphatic hydrocarbon radicals containing from 12 to 18 carbon atoms and wherein X is selected from the group consisting of chlorine and bromine.

3. The method of claim 1 wherein said higher boiling hydrocarbon solvent is kerosene and wherein said quaternary ammonium halide is dicocodimethyl ammonium chloride.

4. The method of claim 1 wherein said higher boiling hydrocarbon solvent is kerosene and wherein said quaternary ammonium halide is cocotrimethyl ammonium chloride.

References Cited in the file of this patent

UNITED STATES PATENTS

| | | |
|---|---|---|
| 2,044,502 | Haller et al. | June 16, 1936 |
| 2,372,183 | Barthel et al. | Mar. 27, 1945 |
| 2,413,107 | Kuhn | Dec. 24, 1946 |